US012745785B2

(12) United States Patent
Bouard et al.

(10) Patent No.: US 12,745,785 B2
(45) Date of Patent: Sep. 29, 2026

(54) FERMENTED BEVERAGES AND PROCESSES OF PREPARING THE SAME

(71) Applicant: Compagnie Gervais Danone, Paris (FR)

(72) Inventors: Fabien Bouard, Chaville (FR); Kari Tronsmo, Vauhallan (FR); Jean-marc Philippe, Leuville sur Orge (FR); Pascal Crepel, Gif sur Yvette (FR); Christophe Daval, Palaiseau (FR); Laurent Marchal, Villemoisson (FR); Philippe Teissier, Palaiseau (FR); Francois Colomban, Paris (FR)

(73) Assignee: Compagnie Gervais Danone, Paris (FR)

( * ) Notice: Subject to any disclaimer, the term of this patent is extended or adjusted under 35 U.S.C. 154(b) by 317 days.

(21) Appl. No.: 18/255,254

(22) PCT Filed: Dec. 3, 2021

(86) PCT No.: PCT/IB2021/000844

§ 371 (c)(1),
(2) Date: May 31, 2023

(87) PCT Pub. No.: WO2022/118076

PCT Pub. Date: Jun. 9, 2022

(65) Prior Publication Data

US 2024/0032568 A1 Feb. 1, 2024

Related U.S. Application Data

(60) Provisional application No. 63/121,290, filed on Dec. 4, 2020.

(51) Int. Cl.

*A23L 2/38* (2021.01)
*A23L 33/135* (2016.01)
*A23L 33/14* (2016.01)

(52) U.S. Cl.

CPC ............ *A23L 2/382* (2013.01); *A23L 33/135* (2016.08); *A23L 33/14* (2016.08)

(58) Field of Classification Search

CPC .......... A23F 3/10; A23L 33/135; A23L 33/14; A23L 2/382; A23L 2/70
USPC .............................. 426/7, 49, 52, 60, 44, 62
See application file for complete search history.

(56) References Cited

U.S. PATENT DOCUMENTS

2020/0109163 A1* 4/2020 Tang .................... C07J 71/0005
2021/0007384 A1* 1/2021 Mahadevan ............ A23L 19/03
2023/0232853 A1* 7/2023 Liu ......................... A23L 33/14
426/52

FOREIGN PATENT DOCUMENTS

CN 101099522 A 8/2007
KR 20110111157 A * 10/2011 ............ A23L 2/382

OTHER PUBLICATIONS

Translation KR20110111157 (Year: 2011).*
Marsh, Fermented beverages with health-promoting potential: Past and future perspectives (Year: 2014).*
Menezes, Combination of probiotic yeast and lactic acid bacteria as starter culture to produce maize-based beverages (Year: 2018).*
Amarasekara, A comparison of kombucha SCOBY bacterial cellulose purification methods, SN Applied Sciences, Published online Jan. 20, 2020 (Year: 2020).*
Cardoso, Kombuchas from green and black teas have different phenolic profile, which impacts their antioxidant capacities, antibacterial and antiproliferative activities, Food Research International, available online Nov. 8, 2019 (Year: 2019).*
Ayed et al, "Development of a beverage from red grape juice fermented with the Kombucha consortium", Nov. 26, 2016, vol. 67, No. 1, p. 111-121.
International Search Report mailed Mar. 16, 2022, issued in PCT/IB2021/000844.
Wang et al., "Effect of synthetic microbial community on nutraceutical and sensory qualities of kombucha", Inter. J. 1 Food Science and Technology, 2020, 55, pp. 3327-3333.

* cited by examiner

*Primary Examiner* — Jennifer McNeil
(74) *Attorney, Agent, or Firm* — ArentFox Schiff LLP

(57) ABSTRACT

The present invention relates to fermented beverages and methods of making the same.

8 Claims, No Drawings

FERMENTED BEVERAGES AND PROCESSES OF PREPARING THE SAME

CROSS-REFERENCE TO RELATED APPLICATIONS

This application is a National Phase of PCT Application No. PCT/IB2021/000844, filed Dec. 3, 2021, which claims priority to U.S. Provisional Application No. 63/121,290, filed Dec. 4, 2020, the disclosures of each of which are hereby incorporated by reference in their entirety.

FIELD OF THE INVENTION

The present invention relates to plant-based products comprising live cultures having good shelf-life and organoleptic characteristics, and processes of preparing the same.

TECHNICAL BACKGROUND

There is increased interest in probiotic food products such as beverages among consumers. According to a definition approved by a joint Food and Agriculture Organization of the United Nations/World Health Organization (FAO/WHO) expert Consultation on Health and Nutritional properties of powder milk with live lactic acid bacteria in 2001, probiotics are "live microorganisms which when administered in adequate amounts confer a health benefit on the host". However, the addition of such species, especially in the context of fermented food products can be challenging as they can introduce undesirable flavours or off-notes to products. The formulation of such products to provide a good shelf life while maintaining high levels of live and active cultures also remains challenging.

Fermented beverages such as kombucha and water kefir are increasingly popular with health-minded consumers who appreciate the potential probiotic benefits of such beverages.

Traditionally such beverages are prepared by fermenting an aqueous base with symbiotic micro-organisms. Kombucha is a lightly sparkling sweetened tea, characterized by a slight vinegary tanginess. It is fermented by means of a symbiotic culture of yeast and acetic-acid producing bacteria encased in a biofilm commonly referred to as a SCOBY, mother or mushroom. Home brewed kombuchas are usually prepared by brewing a tea base to which sugars and fruit can be added and fermenting by means of the SCOBY typically for several days (e.g. 1-2 weeks) at room temperature. Commercial kombuchas are typically pasteurized or otherwise heat treated to inactivate the SCOBY thus allowing for an improved shelf life. Water kefir is a fermented beverage prepared by fermentation of a fruit base, typically water with fruit juice, sugar and optionally fruit pieces. It is prepared by fermentation of symbiotic water kefir grains. However home made or artisanal style products have a limited shelf-life.

EP0791296 provides a method for the preparation of a fermented tea beverage, using an inoculant of yeast and bacteria and fermenting under aerobic conditions. However, the fermented tea beverage prepared according to this patent application has a relatively low acetic acid concentration and in the process insoluble are removed and the beverage is heat-treated, the beverage thus would not contain live and active cultures.

U.S. Pat. No. 8,697,055 discloses a composition comprising the probiotic *Bacillus coagulans* and tea (e.g. a tea bag), it fails to disclose a fermented beverage and thus it appears that the composition taught does not contain the beneficial byproducts of fermentation (often referred to as postbiotics) nor does it have the characteristic composition and organoleptic qualities of fermented tea (e.g. acetic acid).

Summary of Various Embodiments

Plant-based fermented beverages comprising yeast and bacteria and processes for the preparation thereof are disclosed. The inventors found that by fermenting an aqueous vegetal base to a target pH and/or sugar level and then removing a part of the micro-organisms a beverage having good organoleptic characteristic and shelf-life while maintaining high levels of viable cultures could be prepared.

In a first aspect, the present invention provides fermented beverages comprising i) a fermented aqueous vegetal base, ii) at least $10^1$ cfu/ml of yeast, iii) at least $10^1$ cfu/ml bacteria, and iv) a pH of lower than 5.

In a second aspect the present invention provides a process for the preparation of fermented beverage. In one embodiment, the present invention provides a process for the preparation of a fermented beverage comprising fermenting a mixture comprising an aqueous vegetal base, yeast, and bacteria to provide a fermented beverage having a pH of 5 or lower and removing a part of the yeast and bacteria.

DETAILED DESCRIPTION OF VARIOUS EMBODIMENTS

As used herein, the term "ppm" shall be taken to mean "parts per million". One mililitre in 1 liter is 1000 ppm and one thousandth of a mililitre (0.001 g) in 1 liter is one ppm.

As used herein, the term "x % (w/w)" or "x % w/w" is equivalent to "x g per 100 g". Unless indicated otherwise, all % value shall be taken to indicate x % w/w.

As used herein, the term "x % (v/v)" or "x % v/v" is equivalent to "x ml per 100 ml".

In the context of this invention, the term "at least" also includes the starting point of the open range. For example, an amount of "at least 95.00% w/w" means any amount equal to 95.00 percentage by weight or above.

In the context of this invention, the term "about" defines a range of plus or minus 10% of the cited value. For example, an amount of "about 20 weight %" means any amount within the range of 18.00 to 22.00 weight %.

As used herein, the terms "vegan", "plant-based" or "plant based" shall be taken to mean a composition or product which comprises plant or plant-derived matter but which does not comprise animal or animal-derived (e.g. mammal milk) matter.

As used herein, the adjective "dairy" shall be taken to mean a composition or product which comprises or consists of mammalian milk matter, i.e. the lacteal secretion obtainable by milking.

As used herein, the terms "-free" or "free from" shall be taken to mean a composition or product which preferably does not contain a given substance but where trace amounts or contaminants thereof may be present.

As used herein, the term "added sugar" shall refer to sugars that are added during the processing of foods (e.g. refined sugars that may be added to a vegetal base of processed plant matter) as opposed to sugars naturally occurring in said foods. Added sugars include sugars (free, mono- and disaccharides), sugars from syrups and honey, and sugars from concentrated fruit or vegetable juices that are in excess of what would be expected from the same volume of 100 percent fruit or vegetable juice of the same type.

As used herein, the term "fermented plant-based" shall be taken to mean a product or composition that is the product of the acidifying fermentation of a plant-based composition by a starter culture of fermenting microorganisms, in particular yeast, bacteria and or combinations thereof.

As used herein, the term "fermented dairy milk" shall be taken to mean a product or composition derived from dairy milk by the acidifying action of at least one lactic acid bacterium, such as a yogurt (e.g., a set, stirred or drink yogurt), or a fresh cheese such as a white cheese or a "petit-Suisse". It can also be a strained fermented milk such as a strained yoghurt (e.g., a concentrated or Greek-style yoghurt).

As used herein, the terms "plant-based alternative", "analogue" or "substitute" shall be taken to mean a plant-based food or beverage composition that is formulated to simulate the organoleptic and/or nutritional qualities of a non plant-based product. Accordingly, a "plant-based fermented milk alternative" shall be taken to mean a plant-based food or beverage composition that is formulated to simulate the organoleptic and/or nutritional qualities of fermented dairy milk. A "plant-based yogurt" shall be taken to mean a plant-based food or beverage composition that is formulated to simulate the organoleptic and/or nutritional qualities of fermented dairy yogurt.

The term "dairy yogurt" or "plant-based yogurt" as used herein shall be taken to mean fermented dairy or plant-based milk respectively obtained by the acidifying lactic fermentation of the bacteria *Lactobacillus delbrueckii* subsp. *bulgaricus* and *Streptococcus thermophilus* (also referred to as *Streptococcus salivarius* subsp. *thermophilus*), which must be viable in the finished product at a minimum CFU. In certain countries, regulations allow the addition of further lactic acid bacteria to yoghurt such as but not limited to strains of *Bifidobacterium* and/or *Lactobacillus acidophilus* and/or *Lactobacillus casei*. These additional lactic acid bacteria strains are intended to impart various properties to the finished product, such as that of providing organoleptic qualities, favoring equilibrium of intestinal flora or modulating the immune system.

As used herein, the term "strained" shall be taken to mean a fermented composition which has been subjected to a post-fermentation separation process.

As used herein, the term "spoonable" shall be taken to mean a solid or semi-solid that may be consumed by means of a spoon or other utensil.

As used herein the term "beverage" shall be taken to mean a potable liquid or semi-liquid that may be consumed by means of drinking.

As used herein, the term "fermentation" shall be taken to mean the metabolism of a substance by microorganisms, e.g. bacteria, yeasts, or other microorganisms.

As used herein the term "viable" when used in reference to a micro-organism shall be taken to mean a metabolically and physiologically active micro-organism. Means for the detection of viability in micro-organisms are known in the art and include plate count and flow cytometry based methods.

As used herein, the term "cfu" or "CFU" shall be taken to be an abbreviation of the term "colony forming unit".

As used herein, the term "CNCM I-" followed by a 4 digit number shall be taken to refer to a strain deposited at the Collection Nationale de Cultures de Microorganismes (CNCM) 25 rue du Docteur Roux, 75724 Paris, France under the Budapest Treaty with an accession number corresponding to said 4 digit number, e.g. CNCM I-2494. Typically, the strain *Acetobacter malorum* CNCM I-5329 refers to the strain which has been deposited at the Collection Nationale de Cultures de Microorganismes (CNCM) (Institut Pasteur, 25 Rue du Docteur Roux, 75724 Paris, France) under the Budapest Treaty on 12 Jun. 2018 under reference number CNCM 1-5329. As used herein, reference to a bacterial strain or species shall be taken to include functionally equivalent bacteria derived therefrom such as but not limited to mutants, variants or genetically transformed bacteria.

Fermented Beverages

In a first aspect, the present invention provides plant-based fermented beverages comprising viable yeast and bacteria.

In one embodiment, the present invention provides fermented beverages comprising i) a fermented aqueous vegetal base, ii) at least $10^1$ cfu/ml of yeast, iii) at least $10^1$ cfu/ml bacteria, said fermented beverage having a pH equal to or lower than 5.

In embodiments, the fermented beverages of the invention comprise more than about 1, 1.5, 2, 2.5, 3 or 3.5 g per L free acetic acid.

In embodiments, the fermented beverages of the invention comprise less than about 2%, 1.5%, 1.2%, 1.1%, 1%, 0.9%, 0.8%, 0.7% 0.6% or 0.5% by volume ethanol.

In other embodiments, the fermented beverages of the invention are free from, or do not comprise, added sugars. Preferably the fermented beverages of the invention comprise 0.1%-10% w/w sugar, in embodiments 1%-5% w/w sugar, more preferably 2%-4% w/w sugar.

In other embodiments, the fermented beverage is a sparkling or effervescent beverage comprising dissolved gas, in embodiments having a dissolved $CO_2$ content of 0.1-10 g/L, 1-7 g/L or 2-5 g/L.

In other embodiments, the fermented beverages of the invention comprise at least $10^1$ cfu/ml, more preferably at least $10^2$ cfu/ml, such as at least $10^3$ cfu/ml, e.g. at least $5\times10^3$ cfu/ml, of each of said yeasts and bacteria ii) & iii). Preferably, the fermented beverages of the invention comprise $10^1$ cfu/ml-$10^6$ cfu/ml, in embodiments $10^1$ cfu/ml-$10^5$ cfu/ml, $10^1$ cfu/ml-$10^4$ cfu/ml or $10^1$ cfu/ml-$10^3$ cfu/ml.

In embodiments, the yeast comprises 1, 2 or more species of the genera selected from the group consisting of *Brettanomyces, Hansenispora, Torulaspora* and *Saccharomyces* and/or mixtures or combinations thereof. In further embodiments the yeast comprises 1, 2 or more species selected from the group consisting of *Brettanomyces bruxellensis, Hanseniaspora osmophila, Hanseniaspora valbyensis, Torulaspora* sp., *Saccharomyces cerevisiae* and *Saccharomyces uvarum* and/or mixtures or combinations thereof. It is particularly preferred that the yeast is *Saccharomyces cerevisiae.*

The fermented beverages according to embodiments of the invention preferably comprise at least $10^1$, $10^2$, $10^3$, $10^4$, $10^5$ or $10^6$ cfu/ml yeast. In other embodiments, the fermented beverages of the invention comprise $10^1$ to $10^7$, $10^2$ to $10^6$ or $10^3$ to $10^5$ colony forming unit (CFU) yeast per ml of fermented beverage. In a most preferred embodiment, the fermented beverages comprise between $1\times10^3$ and $5\times10^5$ cfu/ml yeast.

In embodiments, the bacteria comprises 1, 2 or more species of the genera selected from the group consisting of *Gluconobacter, Oenococcus, Acetobacter, Bacillus, Lactobacillus* and *Lactococcus* and/or mixtures or combinations thereof. In further embodiments, the bacteria comprises 1, 2 or more species selected from the group consisting of *Gluconobacter cerinus, Oenococcus kitaharae, Acetobacter Malorum, Acetobacter Lambici, Bacillus coagulans, Lacto-* bacillus nagelii, Lactobacillus paracasei, Lactobacillus hilgardii, Lactobacillus hordei, Lactobacillus plantarum, Lactococcus lactic lactis, Lactococcus lactis cremoris* and *Lactococcus taiwanensis* and/or mixtures or combinations thereof. It is particularly preferred that the bacteria comprises 1, 2 or more species selected from the group consisting of *Acetobacter* and *Lactococcus* and/or mixtures or combinations thereof.

The fermented beverages according to embodiments of the invention preferably comprise at least $10^1$, $10^2$, $10^3$, $10^4$, $10^5$ or $10^6$ cfu/ml bacteria. In other embodiments, the fermented beverages of the invention comprise $10^1$ to $10^7$, $10^2$ to $10^6$ or $10^3$ to $10^5$ colony forming unit (CFU) bacteria per ml. In a most preferred embodiment, the fermented beverages comprise between $1\times10^3$ and $5\times10^5$ cfu/ml bacteria.

In embodiments the yeast comprises *Saccharomyces cerevisiae* and the bacteria comprises at least one, two, three or more species of *Acetobacter*, preferably selected from the group consisting of *Acetobacter* Malorum, *Acetobacter* Lambici and/or mixtures or combinations thereof.

In embodiments the yeast comprises *Saccharomyces cerevisiae* and the bacteria comprises at least one, two, three or more species of *Lactococcus*, preferably selected from the group consisting of *Lactococcus lactic lactis, Lactococcus lactis cremoris* and/or mixtures or combinations thereof.

In one embodiment, the aqueous vegetal base is an aqueous suspension comprising water and plant-matter preferably selected from the group consisting of fruits, herbs, spices, flowers, tea and/or combinations or mixtures thereof.

Processes for the preparation of such suspensions are known in the art and typically comprise mixing or combining aqueous solution with the plant matter and heat treating. Optionally, processes for preparation may include a step of removing insoluble solids before or after heat treatment, methods for such removal are known in the art and may be carried out by means of filtration, centrifugation and/or decantering.

Preferably the heat treatment is carried out at a temperature of less than or equal to 100° C. for a time sufficient to ensure that the product is safe to consume after fermentation. In embodiments, the heat treatment is carried out at 70° C. to 100° C., more preferably 80° C. to 100° C. It is within the scope of the skilled person to adjust the time of heat treatment according to the selected temperature, but such treatments may be carried out for less than about 10, 9, 8, 7, 6 or 5 minutes e.g. about 0.1 to about 10 minutes or about 2 to about 5 minutes.

In embodiments, the aqueous vegetal base comprises water in an amount of from 99.99% to 20.0% by weight, preferably 99.99% to 50.0% or more preferably 99.99% to 60.0% or 99.99% to 70.0%.

In embodiments, the aqueous vegetal base comprises added sugars in an amount of 0.01% to 10.00% by weight. In embodiments, the aqueous vegetal base comprises plant matter in an amount of from 0.01% to 80.00% by weight, preferably 0.01% to 50.00% or more preferably 0.01% to 20.00% or 0.01% to 10.00%.

The aqueous base can for example comprise fruit or a fruit preparation in an amount of from 0.1% to 80.00% by weight, for example from 0.1% to 50.00% or 10.00% to 50.00% by weight. Accordingly, in embodiments, the vegetal base comprises fruit. Fruit preparations typically comprise fruits. As used herein the term "fruit" refers to any fruit form, including for example full fruits, pieces, purees, concentrates, juices etc.

Examples of fruits include for example lemon, fig, strawberry, peach, apricot, mango, apple, pear, raspberry, blueberry, blackberry, passion, cherry, and mixtures or associations thereof, such as peach-passion.

The fruits can be for example provided as:

- fruit juices or concentrates thereof, for example fruit juices concentrated from 2 to 5 times, preferably 3 times, for example aseptic fruit juices, for example strawberry, peach, apricot, mango, raspberry, blueberry or apple fruit purees or mixtures thereof,
- dried fruit whole, cubes or in pieces, for example dried whole figs or mixtures thereof,
- frozen fruit whole, cubes or in pieces, for example 10 mm fruit cubes, for example Individual Quick Frozen fruit cubes, for example strawberry, peach, apricot, mango, apple, pear fruit cubes or mixtures thereof,
- Aseptic fruit cubes, for example 10 mm fruit cubes, for example strawberry, peach, apricot, mango, apple or pear fruit cubes or mixtures thereof,
- fruit purees or concentrates thereof, for example fruit purees concentrated from 2 to 5 times, preferably 3 times, for example aseptic fruit purees, for example strawberry, peach, apricot, mango, raspberry, blueberry or apple fruit purees or mixtures thereof,
- single aseptic fruit purees, for example strawberry, raspberry, peach, apricot, blueberry or apple single aseptic fruit purees or mixture thereof,
- frozen whole fruits, for example Individual Quick Frozen whole fruits, for example blueberry, raspberry or blackberry frozen whole fruits, or mixtures thereof,
- mixtures thereof.

In one embodiment, the fermented beverage according to embodiments of the invention is a water-kefir type beverage prepared by the fermentation of an aqueous fruit base. Accordingly in embodiments the vegetal base comprises fruit, preferably fruit juice, concentrate, puree and/or combinations or mixtures thereof. The vegetal base may be prepared by combining or mixing the fruit matter with water.

The aqueous base can comprise tea, herbs, flowers and/or combinations or mixtures thereof in an amount of 0.01% to 10.00% by weight, for example from 0.01% to 5.00% by weight or 0.01% to 2.00%. The tea, herbs and flowers may be in fresh, dried, frozen or freeze dried form or may be in the form of extracts, concentrates or infusions.

In one embodiment the fermented beverage according to embodiments of the invention is a kombucha type beverage prepared by the fermentation of an aqueous tea base. Accordingly in embodiments the vegetal base comprises tea. Methods for the preparation of tea are well known in the art. The aqueous tea base may be prepared by the steeping or soaking of tea leaves in water and combining with fruit and/or added sugars to provide a fermentable base. The tea may be black, white, green or red and may be in fresh or dried form. The tea leaves may be whole, ground and/or powdered. In an alternative embodiment, the aqueous tea base may be provided by dilution of a tea extract and/or liquid concentrate in water.

In embodiments of the invention the vegetal base does not comprise soy, nuts, seeds, grains and/or combinations or mixtures thereof. Particularly preferred is a base free from, or do not comprise, added sugar, where the total carbohydrate content of the vegetal base is derived from plant-matter selected from the group consisting of fruits, herbs, flowers, tea and/or combinations or mixtures thereof.

The fermented beverage may optionally comprise other ingredients such as fermentation aids (such as yeast extract or polypeptides), emulsifiers, stabilizing and flavoring agents. Other ingredients may also include nutritional supplements, vitamins, minerals, trace elements or other micronutrients. such as vitamin A, vitamin B2, vitamin B12, vitamin D, vitamin E, zinc, fiber, protein, calcium, potassium, phosphorus, fatty acids, (e.g., omega 3, omega 6, etc.).

Preferably, the fermented beverage has a pH equal to or lower than 5, 4.5, 4.0 or 3.5. In embodiments the fermented beverage has a pH preferably between about 4 and about 2.5, and more preferably between about 3.5 and about 2.5.

The fermented beverage according to embodiments of the invention is preferably a kombucha type beverage, water kefir type beverage, jun type beverage, tibicos type beverage, drinking vinegar beverage, switchel type beverage, tepache type beverage, cider or equivalents thereof. In embodiments the fermented beverage is not a plant-based dairy alternative, analogue or substitute. In one embodiment, the fermented beverage is a strained fermented beverage.

Preferably, the fermented beverage according to embodiments of the invention, may be stored, transported and/or distributed at a temperature of less than 25° C., preferably from 1° C. to 10° C. for at least about 30 days, at least about 60 days, least about 90 days, at least about 120 days, at least about 180 days, or at least about 210 days or at least about 240 days or at least about 300 days from packaging and remain suitable for consumption while continuing to contain viable yeast and bacteria.

Preferably, the fermented beverage is a packaged product that comprises between $10^1$ to $10^7$, $10^2$ to $10^6$, $10^3$ to $10^1$ colony forming unit (CFU) each of yeast ii) and bacteria iii) per mililitre (ml) of fermented beverage subsequent to packaging and during storage, transport and/or distribution at a temperature of less than 25° C., preferably from 1° C. to 10° C. for about at least about 30 days, at least about 60 days, least about 90 days, at least about 120 days, at least about 180 days, or at least about 210 days or at least about 240 days or at least about 300 days.

Preferably, the fermented beverage is a packaged product that comprises at least about $10^1$, $10^2$, $10^3$, $10^4$, $10^5$ or $10^6$ cfu/ml colony forming unit (CFU) each of yeast ii) and bacteria iii) per mililitre (ml) of fermented beverage subsequent to packaging and during storage, transport and/or distribution at a temperature of less than 25° C., preferably from 1° C. to 10° C. for about at least about 30 days, at least about 60 days, least about 90 days, at least about 120 days, at least about 180 days, or at least about 210 days or at least about 240 days or at least about 300 days.

Preferably, the fermented beverage according to embodiments of the invention is provided in a sealed or sealable container containing about 50 ml (or 50 g) to 2 L (or 1 kg), for example a container of 50 ml (or 50 g) to 80 ml (or 80 g), or 80 ml (or 80 g) to 100 ml (or 100 g), or 100 ml (or 100 g) to 125 ml (or 125 g), or 125 ml (or 125 g) to 150 ml (or 150 g), or 150 ml (or 150 g) to 200 ml (or 200 g), or 200 ml (or 200 g) to 250 ml (or 250 g), or 250 ml (or 250 g) to 300 ml (or 300 g), or 300 ml (or 300 g) to 500 ml (or 500 g), or 500 ml (or 500 g) to 750 ml (or 750 g), or 750 ml (or 750 g) to 1 l (or 1 kg), or 1 l (or 1 kg) to 2 l (or 2 kg) product by volume (or weight).

In other embodiments, the fermented beverage is provided in a sealed or sealable container containing about 50 ml to 500 ml, 60 ml to 500 ml, 70 ml to 500 ml, 75 ml to 500 ml, 80 ml to 500 g, 85 ml to 500 ml, 90 ml to 500 ml, 95 ml to 500 ml, 100 ml to 500 ml, 105 ml to 500 ml, 110 ml to 500 ml, 115 ml to 500 ml, 120 ml to 500 ml, 125 ml to 500 ml, 130 ml to 500 ml, 135 ml to 500 ml, 140 ml to 500 ml, 145 ml to 500 ml, 150 ml to 500 ml, 200 ml to 500 ml, 300 ml to 500 ml, 320 ml to 500 ml or 500 ml product by weight. In other embodiments, the fermented beverage is provided in a sealed or sealable container containing about 1 oz to 12 oz, 2 oz to 12 oz, 3 oz to 12 oz, 4 oz to 12 oz, 5 oz to 12 oz, 6 oz to 12 oz or 12 oz product by volume.

The container can be any suitable beverage container, such as a cup, a can, a bottle, a carton or "brick" packaging, or a flexible container such as a pouch. The container is the packaging of the fermented beverage. The container typically presents an opening and a body. The opening can be sealed by sealing means such as a cap, a flexible lid or a rigid lid. In one embodiment the opening and/or sealing means is a tearable or detachable part of the container.

The container can be made of a material, optionally layered, comprising plastics, preferably recyclable and/or recycled, paper and/or metal, or glass.

In one embodiment, the present invention provides a fermented beverage comprising i) a fermented aqueous vegetal base comprising tea, ii) at least $10^1$ or more preferably at least $10^3$ cfu/ml of yeast, preferably *Sacharomyces cerevisiae* iii) at least $10^1$ or more preferably at least $10^3$ cfu/ml bacteria comprising *Acetobacter*, preferably selected from the group consisting of *Acetobacter* Malorum, *Acetobacter* Lambici and/or mixtures or combinations thereof, said fermented beverage having a pH equal to or lower than 5, more preferably lower than 3.5, comprising 0.1%-10% w/w sugar, preferably 1%-5% w/w sugar, comprising less than about 1.5%, more preferably less than about 0.5% by volume ethanol and comprising more than about 2, 3 or 3.5 g per L free acetic acid.

In one embodiment, the present invention provides a fermented beverage comprising i) a fermented aqueous vegetal base comprising fruit juice, concentrate or puree, ii) at least $10^1$ or more preferably at least $10^3$ cfu/ml of yeast, preferably *Sacharomyces cerevisiae* iii) at least $10^1$ or more preferably at least $10^3$ cfu/ml bacteria preferably comprising *Lactococcus* and optionally further comprising *Lactobacillus*, preferably selected from the group consisting of *Lactococcus* lactic *lactis, Lactococcus lactis cremoris, Lactobaccillus casei* and/or mixtures or combinations thereof, said fermented beverage having a pH equal to or lower than 5, more preferably lower than 3.5, comprising 0.1%-10% w/w sugar, preferably 1%-5% w/w sugar, comprising less than about 2%, more preferably less than about 1.5% by volume ethanol, comprising more than about 2, 3 or 3.5 g per L free acetic acid and wherein said fermented beverage does not comprise added sugars.

Processes for the Preparation of Fermented Beverages

In a second aspect, the present invention provides processes for the preparation of fermented beverages of the invention comprising inoculating a vegetal base with yeast and bacteria and fermenting.

The processes of the invention may be carried out as a process comprising the following steps:

a) providing a mixture comprising:

i) aqueous vegetal base, ii) yeast, and iii) bacteria, and b) fermenting the mixture to provide a reduction in pH and/or sugar, c) removing a part of the yeast and bacteria to provide a beverage comprising at least $10^1$ cfu/ml of each of said yeast and bacteria, d) optionally packaging the fermented beverage.

a) Mixture i) aqueous vegetal base

Methods for prepare mixtures of vegetal bases by inoculation of micro-organisms are known in the art.

In one embodiment, the vegetal base is an aqueous suspension comprising water and plant-matter preferably selected from the group consisting of fruits, herbs, spices, flowers, tea and/or combinations or mixtures thereof.

Processes for the preparation of such suspensions are known in the art and typically comprise mixing or combining aqueous solution with the plant matter and heat treating. Optionally process for preparation may include a step of removing insoluble solids before or after heat treatment, methods for such removal are known in the art and may be carried out by means of filtration, centrifugation and/or decantering.

Preferably the heat treatment is carried out at a temperature of less than or equal to 100° C. for a time sufficient to ensure that the product is safe to consume after fermentation. In embodiments the heat treatment is carried out at 70° C. to 100° C., more preferably 80° C. to 100° C. It is within the scope of the skilled person to adjust the time of heat treatment according to the selected temperature, but such treatments may be carried out for less than about 10, 9, 8, 7, 6 or 5 minutes e.g. about 0.1 to about 10 minutes or about 2 to about 5 minutes.

In embodiments the aqueous vegetal base comprises water in an amount of from 99.99% to 20.0% by weight, preferably 99.99% to 50.0% or more preferably 99.99% to 60.0% or 99.99% to 70.0%.

In embodiments the aqueous vegetal base comprises added sugars in an amount of 0.01% to 10.00% by weight. In embodiments the aqueous vegetal base comprises plant matter in an amount of from 0.01% to 80.00% by weight, preferably 0.01% to 50.00% or more preferably 0.01% to 20.00% or 0.01% to 10.00%.

The aqueous base can for example comprise fruit or a fruit preparation in an amount of from 0.1% to 80.00% by weight, for example from 0.1% to 50.00% or 10.00% to 50.00% by weight. Accordingly in embodiments the vegetal base comprises fruit. Fruit preparations typically comprise fruits. As used herein the term "fruit" refers to any fruit form, including for example full fruits, pieces, purees, concentrates, juices etc.

Examples of fruits include for example lemon, fig, strawberry, peach, apricot, mango, apple, pear, raspberry, blueberry, blackberry, passion, cherry, and mixtures or associations thereof, such as peach-passion.

The fruits can be for example provided as:

- fruit juices or concentrates thereof, for example fruit juices concentrated from 2 to 5 times, preferably 3 times, for example aseptic fruit juices, for example strawberry, peach, apricot, mango, raspberry, blueberry or apple fruit purees or mixtures thereof,
- dried fruit whole, cubes or in pieces, for example dried whole figs or mixtures thereof,
- frozen fruit whole, cubes or in pieces, for example 10 mm fruit cubes, for example Individual Quick Frozen fruit cubes, for example strawberry, peach, apricot, mango, apple, pear fruit cubes or mixtures thereof,
- Aseptic fruit cubes, for example 10 mm fruit cubes, for example strawberry, peach, apricot, mango, apple or pear fruit cubes or mixtures thereof,
- fruit purees or concentrates thereof, for example fruit purees concentrated from 2 to 5 times, preferably 3 times, for example aseptic fruit purees, for example strawberry, peach, apricot, mango, raspberry, blueberry or apple fruit purees or mixtures thereof,
- single aseptic fruit purees, for example strawberry, raspberry, peach, apricot, blueberry or apple single aseptic fruit purees or mixture thereof,
- frozen whole fruits, for example Individual Quick Frozen whole fruits, for example blueberry, raspberry or blackberry frozen whole fruits, or mixtures thereof,
- mixtures thereof.

In one embodiment the fermented beverage according to embodiments of the invention is a water-kefir type beverage prepared by the fermentation of an aqueous fruit base. Accordingly in embodiments the vegetal base comprises fruit, preferably fruit juice, concentrate, puree and/or combinations or mixtures thereof. The vegetal base may be prepared by combining or mixing the fruit matter with water.

The aqueous base can comprise tea, herbs, flowers and/or combinations or mixtures thereof in an amount of 0.01% to 10.00% by weight, for example from 0.01% to 5.00% by weight or 0.01% to 2.00%. The tea, herbs and flowers may be in fresh, dried, frozen or freeze dried form or may be in the form of extracts, concentrates or infusions.

In one embodiment the fermented beverage according to embodiments of the invention is a kombucha type beverage prepared by the fermentation of an aqueous tea base. Accordingly in embodiments the vegetal base comprises tea. Methods for the preparation of tea are well known in the art. The aqueous tea base may be prepared by the steeping or soaking of tea leaves in water and combining with fruit and/or added sugars to provide a fermentable base. The tea may be black, white, green or red and may be in fresh or dried form. The tea leaves may be whole, ground and/or powdered. In an alternative embodiment the aqueous tea base may be provided by dilution of a tea extract and/or liquid concentrate in water.

In embodiments of the invention the vegetal base does not comprise soy, nuts, seeds, grains and/or combinations or mixtures thereof. Particularly preferred is a base free from, or do not comprise, added sugar, where the total carbohydrate content of the vegetal base is derived from plant-matter selected from the group consisting of fruits, herbs, flowers, tea and/or combinations or mixtures thereof.

The fermented beverage may optionally comprise other ingredients such as fermentation aids (such as yeast extract or polypeptides), emulsifiers, stabilizing and flavoring agents. Other ingredients may also include nutritional supplements, vitamins, minerals, trace elements or other micronutrients. such as vitamin A, vitamin B2, vitamin B12, vitamin D, vitamin E, zinc, fiber, protein, calcium, potassium, phosphorus, fatty acids, (e.g., omega 3, omega 6, etc.).

Micro-Organisms ii) and iii)

In embodiments the micro-organisms ii) yeast and iii) bacteria are provided as inoculum suitable for the direct inoculation into, and fermentation of, the aqueous base, typically without the need for a culture step prior to the said direct inoculation. The micro-organisms ii) yeast and iii) bacteria may be inoculated sequentially or concurrently, and may be provided as an inoculum mixture thereof. Typically, the inoculum further comprises excipient or carriers, the selection of which is within the scope of the skilled person but may include buffers or culture media. The inoculum may optionally comprise further components such as cryoprotectants, preservatives and/or additives including nutrients such as yeast extracts, cysteine, sugars and vitamins.

In embodiments the inoculum is fresh, frozen, dried or lyophilized. The inoculum may be in liquid, dry, spray-dried or solid form. It is particularly preferred that the inoculum is in granular or liquid form. The inoculum may be defrosted and/or dispersed in liquid (e.g. water) prior to inoculation.

In embodiments the bacteria and yeast are not physically joined by an extracellular matrix secreted by said micro-organisms, such as a cellulose biofilm (e.g. kombucha "mother" or SCOBY, for Symbiotic Community of Bacteria and Yeast) or polysaccharide matrix grains (such as but not limited to dairy kefir grains or water kefir grains).

In embodiments the yeast comprises 1, 2 or more species of the genera selected from the group consisting of *Brettanomyces, Hansenispora, Torulaspora* and *Saccharomyces* and/or mixtures or combinations thereof. In further embodiments the yeast comprises 1, 2 or more species selected from the group consisting of *Brettanomyces bruxellensis, Hanseniaspora osmophila, Hanseniaspora valbyensis, Torulaspora* sp., *Saccharomyces cerevisiae* and *Saccharomyces uvarum* and/or mixtures or combinations thereof. It is particularly preferred that the yeast is *Saccharomyces cerevisiae.*

In embodiments the bacteria comprises 1, 2 or more species of the genera selected from the group consisting of *Gluconobacter, Oenococcus, Acetobacter, Bacillus, Lactobacillus* and *Lactococcus* and/or mixtures or combinations thereof. In further embodiments the bacteria comprises 1, 2 or more species selected from the group consisting of *Gluconobacter cerinus, Oenococcus kitaharae, Acetobacter Malorum, Acetobacter* Lambici, *Bacillus coagulans, Lactobacillus nagelii, Lactobacillus paracasei, Lactobacillus casei, Lactobacillus hilgardii, Lactobacillus hordei, Lactobacillus plantarum, Lactococcus lactic lactis, Lactococcus lactis cremoris* and *Lactococcus taiwanensis* and/or mixtures or combinations thereof.

It is particularly preferred that the bacteria comprises 1, 2 or more species selected from the group consisting of *Acetobacter* and *Lactococcus* and/or mixtures or combinations thereof.

In embodiments the yeast comprises *Saccharomyces cerevisiae* and the bacteria comprises at least one, two, three or more species of *Acetobacter*, preferably selected from the group consisting of *Acetobacter* Malorum, *Acetobacter* Lambici and/or mixtures or combinations thereof.

In embodiments the yeast comprises *Saccharomyces cerevisiae* and the bacteria comprises at least one, two, three or more species of *Lactococcus*, preferably selected from the group consisting of *Lactococcus lactic lactis, Lactococcus lactis cremoris* and/or mixtures or combinations thereof.

b) Fermentation

Fermentation of the mixture is carried out by incubating the mixture at a temperature suitable for the metabolization of the vegetal base by the bacteria to provide a reduction in pH and/or sugar. Suitable temperatures for such fermentation are typically about 20° C. to about 45° C., more preferably about 25° C. to about 35° C. and the temperature is maintained for an incubation time sufficient to provide the desired reduction in pH and/or sugar. In embodiments of the invention fermentation may be carried out under pressure of e.g. up to 1 bar, 2 bar or 3 bar.

In embodiments of the invention fermentation may be carried out under aeration or oxygenation of the mixture.

In embodiments of the invention fermentation may be carried out under agitation of the mixture. Preferably, the fermented beverage is prepared by culture of the mixture to provide a reduction in pH, preferably to a pH equal to or lower than 5, 4.5, 4.0 or 3.5. In other embodiments, the fermentation is carried out to a pH preferably between about 4 and about 2.5, and more preferably between about 3.5 and about 2.5.

Preferably, the fermented beverage is prepared by culture of the mixture to provide an increase in micro-organism content to at least about $10^6$, more preferably $10^6$ to $10^9$, or $10^7$ to $10^8$ cfu/ml each of bacteria and yeast.

Preferably, the fermented beverage is prepared by culture of the mixture to provide a reduction in pH, preferably to a pH equal to or lower than 5, 4.5, 4.0 or 3.5.

Preferably, the fermented beverage is prepared by culture of the mixture at a suitable temperature with the microorganisms to provide the required reduction in pH and sugar levels, preferably by culturing for less than or equal to about 72, 48, 36 or 24 hours.

The pH and/or sugar can be adjusted by controlling the fermentation by the microorganism and stopping it when appropriate. The fermentation is stopped, for example, by cooling when the desired target pH and/or sugar levels are reached. Preferably, a stage of cooling of the fermented beverage is performed such that the temperature at the end of the cooling is less than about 22° C. preferably about 4° C. to about 10° C.

c) Removal of Micro-Organisms

The process for the preparation of a fermented beverage comprises a stage of separation to provide a reduction in the amount of the micro-organisms ii) yeast and iii) bacteria.

Preferably, the fermented beverage is prepared by removal of micro-organisms to provide a reduction in micro-organism content to less than about $10^9$, $10^8$, $10^7$, $10^6$ or $10^5$ colony forming unit (CFU) each of bacteria and yeast per mililitre of fermented beverage. In a most preferred embodiment, fermented beverage is prepared by removal of micro-organisms to provide a reduction in micro-organism content to between $10^1$ to $10^7$, $10^2$ to $10^6$, $10^3$ to $10^1$ cfu/ml each of bacteria and yeast.

Methods for the separation of micro-organisms are known to the one skilled in art, and can for example be carried out by filtration (e.g. membrane or kieselguhr), centrifugation or decantering. The reduction in CFU may be achieved by partial removal of the micro-organisms from the vegetal base or by complete removal of the micro-organisms and then by re-incorporation of the required fraction of the micro-organisms into the vegetal base.

Optionally the fermented mixture may be carbonated with $CO_2$ gas prior to packaging to provide a product having a dissolved $CO_2$ content of 0.1-10 g/L, 1-7 g/L or 2-5 g/L.

Optionally the product may be packaged into a suitable container. Preferably, the fermented beverage, according to embodiments of the invention is provided in a sealed or sealable container containing about 50 ml (or 50 g) to 2 L (or 1 kg), for example a container of 50 ml (or 50 g) to 80 ml (or 80 g), or 80 ml (or 80 g) to 100 ml (or 100 g), or 100 ml (or 100 g) to 125 ml (or 125 g), or 125 ml (or 125 g) to 150 ml (or 150 g), or 150 ml (or 150 g) to 200 ml (or 200 g), or 200 ml (or 200 g) to 250 ml (or 250 g), or 250 ml (or 250 g) to 300 ml (or 300 g), or 300 ml (or 300 g) to 500 ml (or 500 g), or 500 ml (or 500 g) to 750 ml (or 750 g), or 750 ml (or 750 g) to 11 (or 1 kg), or 11 (or 1 kg) to 2 1 (or 2 kg) product by volume (or weight).

In other embodiments, the fermented beverage is provided in a sealed or sealable container containing about 50 ml to 500 ml, 60 ml to 500 ml, 70 ml to 500 ml, 75 ml to 500 ml, 80 ml to 500 g, 85 ml to 500 ml, 90 ml to 500 ml, 95 ml to 500 ml, 100 ml to 500 ml, 105 ml to 500 ml, 110 ml to 500 ml, 115 ml to 500 ml, 120 ml to 500 ml, 125 ml to 500 ml, 130 ml to 500 ml, 135 ml to 500 ml, 140 ml to 500 ml, 145 ml to 500 ml, 150 ml to 500 ml, 200 ml to 500 ml, 300 ml to 500 ml, 320 ml to 500 ml or 500 ml product by weight. In other embodiments, the fermented beverage is provided in a sealed or sealable container containing about 1 oz to 12 oz, 2 oz to 12 oz, 3 oz to 12 oz, 4 oz to 12 oz, 5 oz to 12 oz, 6 oz to 12 oz or 12 oz product by volume.

The container can be any suitable beverage container, such as a cup, a can, a bottle, a carton or "brick" packaging, or a flexible container such as a pouch. The container is the packaging of the fermented beverage. The container typically presents an opening and a body. The opening can be sealed by sealing means such as a cap, a flexible lid or a rigid lid. In one embodiment the opening and/or sealing means is a tearable or detachable part of the container.

The container can be made of a material, optionally layered, comprising plastics, preferably recyclable and/or recycled, paper and/or metal, or glass.

In embodiments the processes of the invention may be carried out as a process comprising the following steps:

e) providing a mixture comprising:
  i) aqueous vegetal base comprising tea,
  ii) yeast, preferably *Saccharomyces cerevisiae* and
  iii) bacteria comprising *Acetobacter*, preferably selected from the group consisting of *Acetobacter Malorum, Acetobacter Lambici* and/or mixtures or combinations thereof, and
f) fermenting the mixture to provide a reduction in pH equal to or lower than 5, more preferably lower than 3.5,
g) removing a part of the yeast and bacteria to provide a beverage comprising at least $10^1$ cfu/ml of each of said yeast and bacteria
h) optionally packaging the fermented beverage.

In embodiments, the processes of the invention may be carried out as a process comprising the following steps:

a) providing a mixture comprising:
  i) aqueous vegetal base comprising fruit juice, concentrate or puree,
  ii) yeast, preferably *Saccharomyces cerevisiae* and
  iii) bacteria
  comprising *Lactococcus* optionally further comprising *Lactobacillus*, preferably selected from the group consisting of *Lactococcus* lactic *lactis, Lactococcus lactis cremoris, Lactobacillus casei* and/or mixtures or combinations thereof, and
b) fermenting the mixture to provide a reduction in pH equal to or lower than 5, more preferably lower than 3.5,
c) removing a part of the yeast and bacteria to provide a beverage comprising at least $10^1$ cfu/ml of each of said yeast and bacteria
d) optionally packaging the fermented beverage.

The invention will be further illustrated by the following non-limiting Examples.

EXAMPLES

The following examples demonstrate the preparation of fermented beverages typically prepared using symbiotic organisms SCOBY (kombucha) and grains (water kefir) using lyophilized inoculants that allow for the standardization of micro-organism content in a final product having a good shelf-life with viable bacteria. The products were prepared using a simplified combination of yeast and bacteria that provided an organoleptic equivalent of products prepared using symbiotic organisms.

Example 1: Kombucha Type Beverage Preparation (Kieselguhr Clarification)

An aqueous vegetal base was prepared by mixing 0.6 g/L black tea (Naturex™), 50 g/L raw cane sugar, yeast extract (Biospringer™) 0.2 g/L, 94.9 g/L, the base was then heat treated at 95° C. for 3 minutes and cooled to 30° C. The aqueous base was inoculated by mixing dried yeast (Lesaffre™ Oeno CK-S102) 0.001% v/v and lyophilized *Acetobacter* (CNCM I-5329) 0.02% v/v. Fermentation was carried out at 30° C. under 1 bar pressure with oxygenation at 0.1 VVM. Fermentation was carried out until pH was below 3.5, typically in the target range of 2.8-3.2 (about 32 hours) and target migro-organism content of $10^7$ to $10^8$ each of bacteria and yeast.

Fermentation was stopped by rapid cooling to 6° C. A fraction of the cooled fermented product was then clarified by means of a kieselguhr process and then the filtered fraction was recombined with a non-filtered fraction to achieve a target micro-organism content of yeast $10^4$-$10^{51}$ CFU/ml and a bacterial content of above $10^3$ CFU/ml. A final step of carbonation was carried out at 0.7 bar pressure, as required, to achieve a target of 3-5 g/L dissolved $CO_2$ before bottling and storage at 6° C. The final product had an ethanol content of less than 0.5% v/v and an acetic acid content of 3 g/L and target CFU was maintained over at least 2 months of storage. Equivalent results were also subsequently obtained using dried yeast (Lesaffre™ Oeno CK-S102) 0.01% v/v.

Example 2: Kombucha Type Beverage Preparation (Centrifugation Clarification)

An aqueous vegetal base was prepared by mixing 0.6 g/L black tea (Naturex™), 50 g/L raw can sugar, yeast extract (Biospringer™) 0.2 g/L, 94.9 g/L, the base was then heat treated at 95° C. for 3 minutes and cooled to 30° C. The aqueous base was inoculated by mixing dried yeast (Lesaffre™ Oeno CK-S102) 0.001% v/v and lyophilized *Acetobacter* (CNCM I-5329) 0.02% v/v. Fermentation was carried out at 30° C. under 1 bar pressure with oxygenation at 0.1 VVM. Fermentation was carried out until pH was below 3.5, typically in the target range of 2.8-3.2 (about 32 hours). Fermentation was stopped by rapid cooling to 6° C. Clarification was carried out on the total volume of fermented product by centrifugation at 8000 g and flow rate adjusted to provide a filtrate having the target micro-organism content of yeast $10^4$-$10^5$ CFU/ml and a bacterial content of above $10^3$ CFU/ml. A final step of carbonation was carried out at 0.7 bar pressure, as required, to achieve a target of 3-5 g/L dissolved $CO_2$ before bottling and storage at 6° C. The final product had an ethanol content of less than 0.5% v/v and an acetic acid content of 3 g/L and target CFU was maintained over at least 2 months of storage.

Example 3: Water Kefir Type Preparation (Centrifugation Clarification)

An aqueous vegetal base was prepared by mixing 3% v/v lemon juice, 26.2% v/v white grape juice, 70.7% v/v. The base was then heat treated at 80° C. for 3 minutes and cooled to 30° C. The aqueous base was inoculated by mixing dried yeast (*S. cerevisiae*) 0.01% v/v and a lyophilized bacterial culture blend (*L. casei, Lc. lactis cremoris, Lc. lactis lactis*) 0.01% v/v. Fermentation was carried out at 25° C. under 1.3 bar pressure until the target sugar range 3-4 g/l was achieved (about 18 hours). Fermentation was stopped by rapid cooling to 6° C. Clarification was carried out on the total volume of fermented product by centrifugation at 8000 g and flow rate adjusted to provide a filtrate having the target micro-organism content of yeast $10^4$-$10^5$ CFU/ml and a bacterial content of above $10^3$ CFU/ml. Flavouring agents (lemon ginger extracts) were injected into the beverage and a final step of carbonation was carried out at 0.7 bar pressure, as required, to achieve a target of 3-4 g/L dissolved $CO_2$ before bottling and storage at 6° C. The final product had an ethanol content of less than 1.2% v/v and target CFU was maintained over at least 8 months of storage.

Example 4: Water Kefir Type Preparation (Kieselguhr Clarification)

An aqueous vegetal base was prepared by mixing 3% v/v lemon juice, 26.2% v/v white grape juice, 70.7% v/v. The base was then heat treated at 80° C. for 3 minutes and cooled to 30° C. The aqueous base was inoculated by mixing dried yeast (*S. cerevisiae*) 0.01% v/v and a lyophilized bacterial culture blend (*L. casei*, Lc. *lactis cremoris*, Lc. *lactis lactis*) 0.01% v/v. Fermentation was carried out at 25° C. under 1.3 bar pressure until the target sugar range 3-4 g/l was achieved (about 18 hours). Fermentation was stopped by rapid cooling to 6° C. A fraction of the cooled fermented product was then clarified by means of a kieselguhr process and then the filtered fraction was recombined with a non-filtered fraction to achieve a target micro-organism content of yeast $10^4$-$10^5$ CFU/ml and a bacterial content of above $10^3$ CFU/ml. Flavouring agents (lemon ginger extracts) were injected into the beverage and a final step of carbonation was carried out at 0.7 bar pressure, as required, to achieve a target of 3-4 g/L dissolved $CO_2$ before bottling and storage at 6° C. The final product had an ethanol content of less than 1.2% v/v. The final product had an ethanol content of less than 1.2% v/v and target CFU was maintained over at least 8 months of storage.

The invention claimed is:

1. A process for the preparation of a fermented beverage comprising:

a) providing a mixture comprising:
   i) aqueous vegetal base;
   ii) yeast; and
   iii) bacteria;
b) fermenting the mixture to provide a fermented beverage having a pH of 5 or lower, $10^6$-$10^9$ cfu/ml of said yeast, and $10^6$-$10^9$ cfu/ml of said bacteria;
c) removing a part of the yeast and bacteria to provide a fermented beverage comprising $10^3$-$10^5$ cfu/ml of said yeast, and $10^3$-$10^5$ cfu/ml of said bacteria; and
d) packaging the fermented beverage.

2. The process of claim 1, wherein the fermented beverage comprises more than 1 g per L free acetic acid.

3. The process of claim 1, wherein step b) comprises fermenting the mixture to provide a fermented beverage having $10^7$-$10^8$ cfu/ml of said yeast and $10^7$-$10^8$ cfu/ml of said bacteria.

4. The process of claim 1, wherein step c) comprises removing a part of the yeast and bacteria to provide a fermented beverage comprising $10^4$-$10^5$ cfu/ml of said yeast, and $10^4$-$10^5$ cfu/ml of said bacteria.

5. The process of claim 1, wherein the aqueous vegetal base does not comprise soy, nuts, seeds, grains and/or combinations thereof.

6. The process of claim 1, wherein the aqueous vegetal base does not comprise added sugar.

7. The process of claim 1, further comprising carbonating the fermented beverage with $CO_2$ gas after step c) and before step d).

8. The process of claim 1, wherein the bacteria and yeast are not physically joined by an extracellular matrix secreted by said bacteria and yeast.

* * * * *